H. L. WITTSTEIN.
GAGE.
APPLICATION FILED MAY 18, 1918.
1,284,017.
Patented Nov. 5, 1918.
2 SHEETS—SHEET 1.
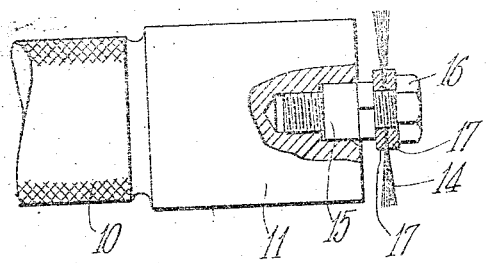
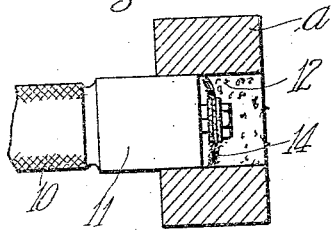
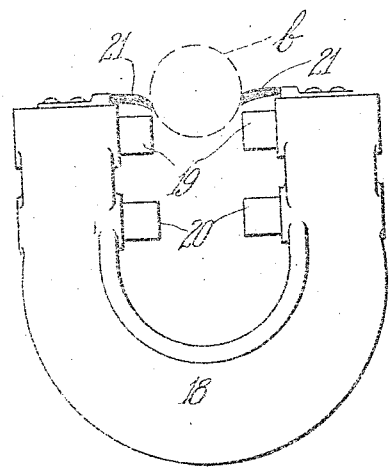
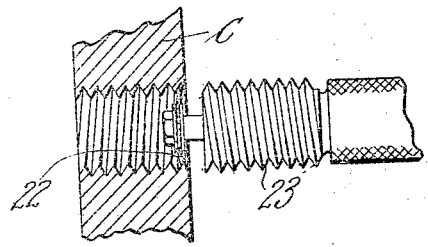
INVENTOR.
Herman L. Wittstein
BY Chapin & Neal
ATTORNEYS

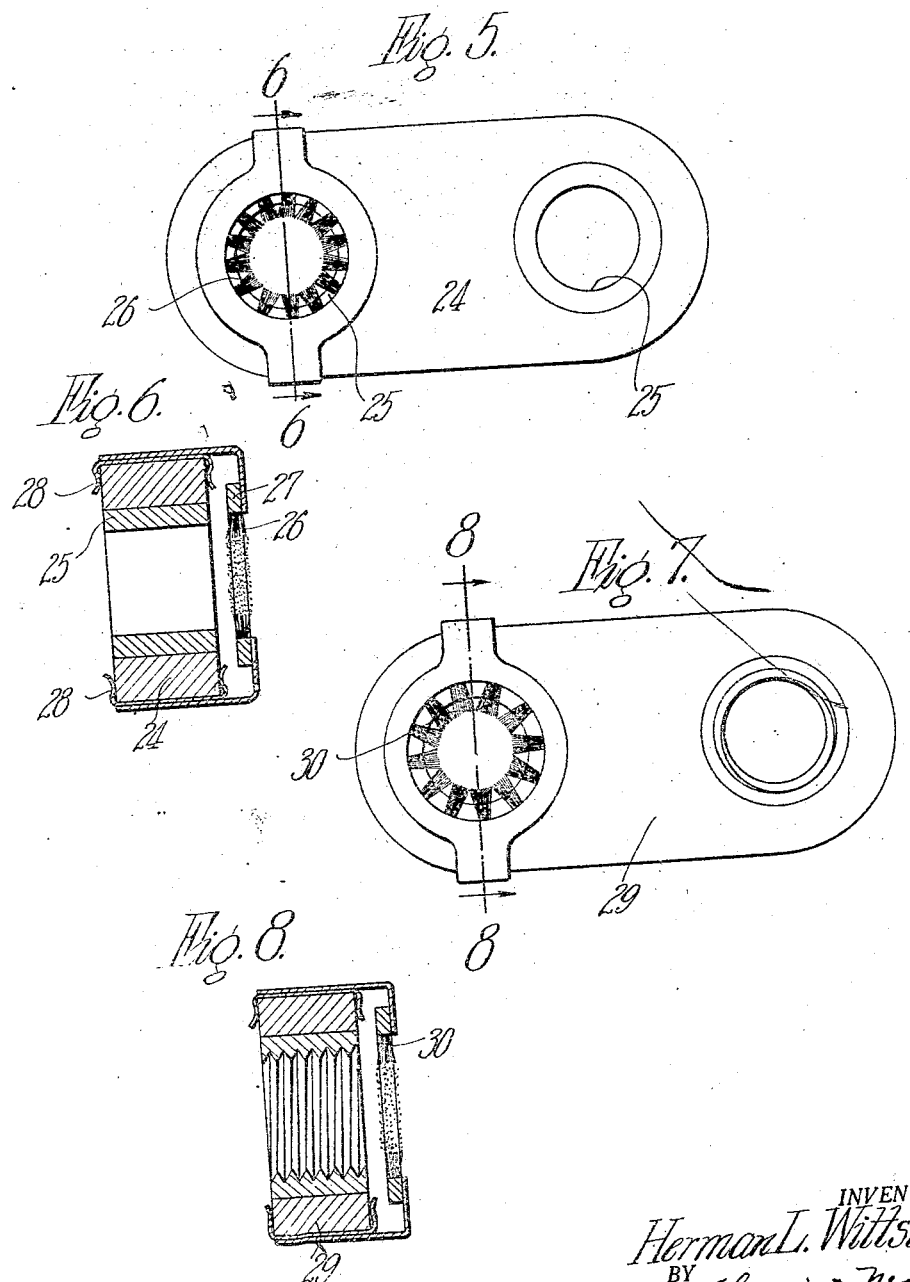

UNITED STATES PATENT OFFICE.

HERMAN L. WITTSTEIN, OF SPRINGFIELD, MASSACHUSETTS.

GAGE.

1,284,017.        Specification of Letters Patent.        Patented Nov. 5, 1918.

Application filed May 18, 1918.   Serial No. 235,376.

*To all whom it may concern:*

Be it known that I, HERMAN L. WITTSTEIN, a citizen of the United States of America, residing at Springfield, in the county of Hampden and State of Massachusetts, have invented certain new and useful Improvements in Gages, of which the following is a specification.

This invention relates to gages and more particularly to that class of gages known as fixed dimension gages, such as plug, ring, and snap gages as well as male and female screw thread gages and the like.

In the practical use of such fixed dimension gages, the workman applies the gage to test the accuracy of his work. The article tested is frequently taken directly from the machine in which it was finished and the surface or surfaces to be gaged are apt to be covered with oil, specks of dirt, chips, particles of abrasive substances and the like. Although gages of the type mentioned are very expensive, since they are precision instruments, which require careful use, it is very difficult to get the average workman to use the gages with the necessary degree of care. Particularly, it is practically impossible to insure that each article, prior to testing, is carefully wiped free from foreign substances before the application of the gage to that article. As a consequence, these foreign substances, generally of an abrasive nature, act detrimentally on the gage surfaces and cause wear thereof. The wear may be slight in each instance, but it is rapidly cumulative under repeated applications of the gage with the result that the accuracy of the gage is soon destroyed and a new one made necessary at a much earlier period than would have been necessary had the workman used due care. Aside from the undesirable wear on the surfaces of the gage, the presence of foreign material on the article to be gaged also interferes with accurate measurement. Thus, a plug gage, when inserted in a hole having particles of foreign material therein, might seem to the workman to fit properly whereas the seeming tightness of the plug in the hole might in fact be caused by the presence of foreign material. This invention seeks to overcome the difficulties set forth.

The object of this invention is to provide in a gage a cleaning device, as a brush, which is so arranged with relation to the gage as to combine with the latter by engaging the surface or surfaces of the article to be gaged in advance of the gage itself, whereby the article may be effectively cleaned prior to gaging.

Other objects and advantages will appear in the following description and in the appended claims.

The invention is disclosed in various illustrative forms in the accompanying drawings, in which:

Figure 1 is a fragmentary elevational view of a plug gage embodying the invention;

Fig. 2 is a somewhat similar view showing the manner of using the gage;

Fig. 3 is an elevational view of a snap gage embodying the invention;

Fig. 4 is an elevational view showing the invention as applied to a male screw thread gage;

Fig. 5 is an elevational view of a ring gage with the invention applied thereto;

Fig. 6 is a cross sectional view taken on the line 6—6 of Fig. 5;

Fig. 7 is an elevational view showing the invention as applied to a female screw thread gage; and Fig. 8 is a cross sectional view taken on the line 8—8 of Fig. 7.

Referring to Fig 1 a plug gage 10 of usual form is shown and this gage has an accurately ground cylindrical surface 11 which is adapted to be inserted in a hole, as 12 in Fig. 2, of an article to be tested, as the ring $a$ in Fig. 2. The invention consists in applying to the plug 10 a cleaning device, such as a brush 14, and in so locating this device that it must enter the hole to be gaged in advance of the surface 11.

The cleaning device may be of any suitable material and the material of which it is made may obviously be varied to suit the requirements of the particular work in hand. Thus, for ordinary machined articles, where only oil, chips and the like are present, a brush 14 made up of pig bristles may be used while if the articles have carbonized material thereon, such as the scale and flakes incident to articles which have been pac hardened a brush made up of wire bristles may advantageously be used.

The preferred mounting of brush 14 on the plug gage 10 consists of a stud 15, which is threaded centrally into the plug as shown in Fig. 1, and a nut 16, which functions to clamp the bristles of brush 14 between two washers 17 loosely mounted on the stud. With this construction the bristles of the brush may be conveniently assembled and the entire assembly may then be readily applied to the plug 10 and as readily and conveniently removed therefrom.

The plug gage 10 may have a single measuring end or may be of the "tolerance" type having two measuring surfaces which define the allowable limits of size variation. Obviously with such a gage the brush may be applied to both ends, if desired, although it is usually sufficient if the brush is applied to the smaller or "go" end since such end is usually used first and the surface of the work therefore will have been cleaned prior to the application of the larger or "no go" end.

The invention is capable of general application, however, and may be applied to other gages than that type already described. For example, with the so-called "snap gage" 18 (Fig. 3), having pairs of opposed abutments 19 and 20 between which articles, as $b$, may be calipered, may have a pair of brushes 21 suitably mounted in opposition on the gage, as shown, so that the article $b$ must be engaged and cleaned prior to its engagement with either pair of abutments 19 or 20. Obviously, the invention is equally applicable to a gage of this type having only one pair of abutments. In Fig. 4, a brush 22 is applied to the end of a male screw thread gage 23 in a manner analogous to that described in connection with Fig. 1. The brush 22 in this instance is so constructed as to enter the internal threads of an article $c$ and clean them prior to the entrance of the threads on gage 23. In Figs. 5 and 6, a ring gage 24 of the tolerance type has been illustrated. To one of the rings 25, of this gage or to both if desired, a brush 26 may readily be applied to engage and clean cylindrical surfaces prior to their insertion in the rings. The brush 25 is preferably applied to the "go" ring of the gage and may be mounted, as best shown in Fig. 6, on an annular frame 27 which has spring jaws 28 to snap over the gage frame 24. By such construction the one brush may readily be used with several different gages or shifted from one ring to the other of the same gage. For female screw thread gages, as 29 (Figs. 7 and 8), a brush 30 may be applied in a manner identical with that already described.

Thus, the invention provides a cleaning device which is applicable generally to gages and is characterized in that the device is arranged to engage the surfaces to be tested in advance of the gage itself, whereby such surfaces may be cleaned preparatory to engagement by the gage. With this arrangement it will be readily apparent that the usual life of the gage is greatly increased due to the prevention of wear on the gage by the abrasive action of the foreign materials present on the articles to be gaged. It has also been shown that there is a substantial advantage due to increased accuracy of measurement which follows from the prevention of foreign material lodging between the gage and the surfaces tested thereby. The cleaning device also has another important function in that it pilots the gage into engagement with the article to be gaged. Thus with the plug gage described, the brush acts to guide the plug into the hole in the article to be tested and thereby prevents to a large extent the wear commonly occurring adjacent the entrance end of the plug.

The invention has been disclosed herein for the purposes of illustration, but the scope of the invention is defined by the appended claims rather than by the foregoing description.

What I claim is—

1. The combination with a gage of a cleaning device carried thereby and so arranged with relation thereto as to engage the article to be gaged in advance of the gage and entirely remove foreign materials from said article by contact therewith.

2. The combination with a gage of brushing means carried thereby and arranged in such relation with the gage as to engage the article to be gaged in advance of the gage and clean such portions of the article as will subsequently be engaged by the gage.

3. The combination with a gage of a flexible device carried thereby, said device arranged to engage the article to be tested in advance of the gage for the purpose of cleaning the article and piloting the gage into engagement with the article.

HERMAN L. WITTSTEIN.